Feb. 17, 1931.   S. E. MEYERS   1,792,918
METHOD AND APPARATUS FOR HEATING SUBSTANCES
Filed Nov. 21, 1925
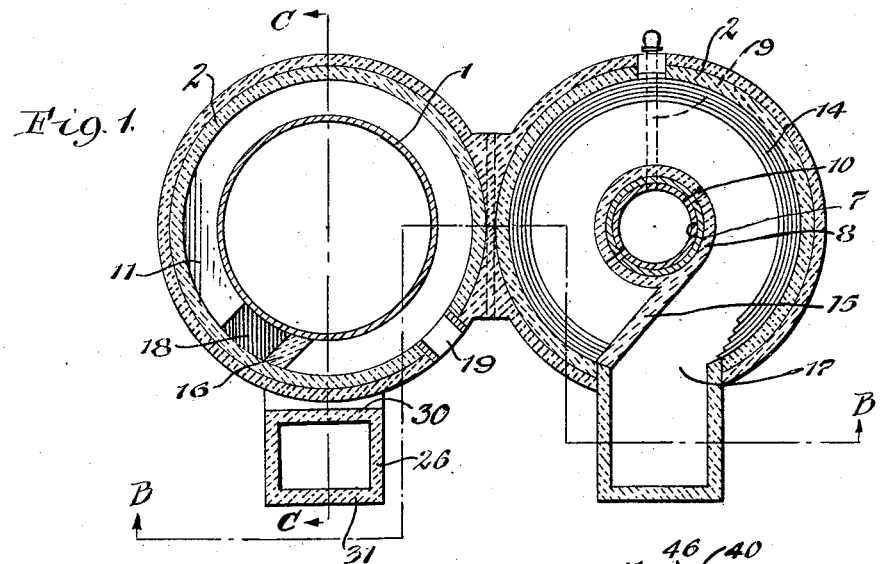
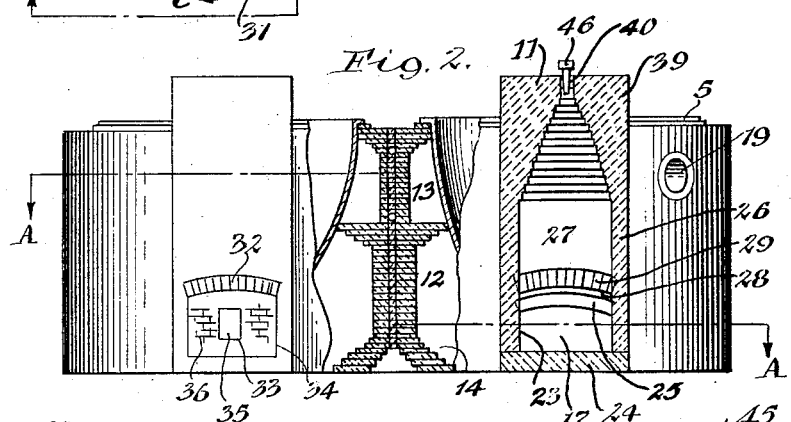
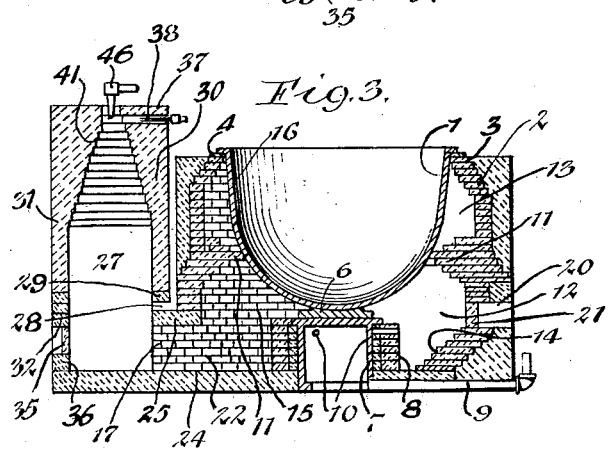
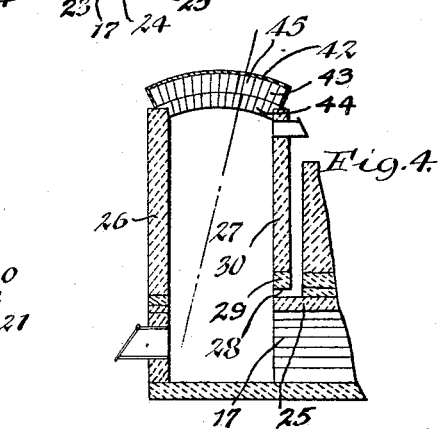
Inventor
S. E. MEYERS.
by William J. Warslike
Attorney Patented Feb. 17, 1931

1,792,918

UNITED STATES PATENT OFFICE

SIDNEY E. MEYERS, OF BUFFALO, NEW YORK, ASSIGNOR TO NATIONAL ANILINE & CHEMICAL CO., INC., OF NEW YORK, N. Y., A CORPORATION OF NEW YORK

METHOD AND APPARATUS FOR HEATING SUBSTANCES

Application filed November 21, 1925. Serial No. 70,493.

This invention relates to a method and apparatus for heating substances, particularly to the heating of chemicals in large vessels or containers.

The preparation of chemical compounds with heating demands adequate control of temperature and substantial uniformity in its application to the containing vessels; and practical considerations of economy and availability of heating materials point to the desirability of direct fire heating with the use of fuels, particularly oils, by the combustion of which heating is effected without the need of special chemical apparatus. A usual arrangement of oil burners for heating is the direct flame impingement on the vessel and the supporting masonry. With such an arrangement it is found that spots are burned in the vessel requiring frequent turning to prolong its life, the heating is non-uniform, heat is largely wasted in the stack, and deterioration of the masonry necessitates practical rebuilding. In addition, the burner being at one level at a distance from the vessel, and the operating zone of the vessel being at another level, close supervision of the preparation of the compound and simultaneous heat control are not practicable.

By the present invention, substantial uniformity in the heating of a vessel by the combustion of liquid or powdered fuel is obtained without the formation of hot spots in the wall of the vessel. It provides a furnace structure that promotes combustion of the fuel by baffling the burning mixture within a combustion chamber prior to its contact with the vessel; and it is of a character wherein the masonry exposed to the action of the high heat is protected from such action and is in addition readily removed and replaced without interfering with the remaining furnace structure. It also provides a setting for the vessel that conveys heat to the latter by radiation and convection without substantial direct impingement on the vessel to cause local overheating, and that equalizes the heat so transferred to the vessel. It further provides a combined setting and an associated furnace of compact form and occupying relatively small area wherein furnace control and vessel manipulation are readily associated. In addition, there are structural details giving a relatively long life to the combined furnace and setting with a minimum of attention or replacement.

A suitable apparatus for the accomplishment of these objects comprises a setting for the container, an upstanding furnace separated from the setting, and a section connecting the lower portions of the setting and the furnace, the whole constituting an upright U-shaped structure or an enlarged U-tube. Fuel and air are injected into the upper portion of the furnace at about the operating level of the setting, and combustion is initiated. Inasmuch as the gases of combustion are of greatly increased volume, a turbulence is set up retarding flame propagation, and the whole chamber is utilized for promoting complete and sustained combustion. This action is further accentuated by the deflection or change in direction of the flow of gases at the lower portion of the upright chamber into the horizontal section, further baffling the gases. Complete combustion is also assisted by having the container absent from the combustion zone thereby obviating its cooling effects. The arch, forming the horizontal section that connects the furnace and setting, is separated from the remaining structure so that it carries no weight and can be readily replaced without interference; and, in addition, it is protected from deterioration by a jet of secondary air which passes over its surface. The gases entering the setting are directed about the container, thus avoiding direct impingement normally to the surface of the container and consequent hot spots; and a counter-current flow of the gases about the container promotes a uniformity in the heating of the container, for the higher heating effect of the hotter incoming gases is balanced by that of the gradually cooler outflowing gases.

In the accompanying drawing, an embodiment of the invention is specifically illustrated, in which Fig. 1 is a horizontal sectional view on the line A—A of Fig. 2;

Fig. 2 is an elevation partly in cross-section on the line B—B of Fig. 1;

Fig. 3 is a vertical section on the line C—C of Fig. 1; and

Fig. 4 shows a modified furnace construction.

In these figures a pair of furnaces and settings are illustrated. But as they are built in pairs for compactness and economy of material, and as each setting and its associated furnace is a substantial duplicate of the other, the following description refers to but one of them.

A container or vessel 1 is supported within an annular wall 2 spaced from the vessel. A ledge 3 projects inwardly from the wall on which rests a ring 4 engaging a flange 5 on the vessel. The vessel rests on a centrally placed pedestral 6 superimposed on a metal base 7 and the base is protected by a surrounding wall of fire-brick 8. A pipe 9 leads cooling air to the interior of the base and outlets 10 from the base open into the space about the kettle. An inwardly projecting ledge or course of fire-brick 11, contacts with the vessel and divides the space about the vessel into two horizontal channels or passages 12 and 13; the lower passage is perfectly corbeled, as at 14 to reflect radiant heat to the vessel. A baffle wall 15 contacts the vessel and connects the annular exterior wall 2 and the base protecting wall 8 tangentially to the latter in the lower passage 12, and a similarly placed baffle 16 extends across the upper passage 13 to the vessel. An opening 17 in the annular wall adjacent the lower baffle leads into the lower passage, and on the opposite side of the baffle an opening 18 is formed in the ledge or brick course 11 separating the passages, thus providing a connection between them. A stack opening 19 is located at the far end of the upper passage 13 from the opening 18 substantially above the inlet opening 17. In the annular wall opposite the inlet opening 17 is a clean-out opening 20 closed by any suitable means, such as removable brickwork 21.

Built about the inlet opening 17 is a horizontal section 22 formed of firebrick and consisting of vertical walls 23, floor 24 and arch 25. A furnace structure 26 extends upwardly from this section and encloses a combustion zone or space 27. The top wall of the section formed by the arch 25, which is substantially on a level with the top of the base 7, is separated by a space 28 from an arch 29 which carries the weight of the rear furnace wall 30 above it; and the nose of the arch is located at the reentrant angle formed by the vertical combustion chamber and the horizontal section. As the arch 25 is thus separated it can be removed or replaced readily without affecting the rest of the structure. The front wall 31 of the furnace is similarly carried by an arch 32, and bricked within the openings so formed is a peephole 33 and a cleanout 34. The peephole is closed by a loose brick 35, and the cleanout opening is preferably closed with removable brickwork 36. Other sight openings are located in the furnace and setting at convenient points.

The furnace extends somewhat above the upper level of the vessel or container, and in the rear wall 37, or side facing the vessel, is an opening 38. In view of the regular cross-section of the furnace, it is found feasible to form the top by corbeling the brickwork 39 in from all sides, leaving an opening 40 for a fuel burner 46 of any desired type. The corbeled brickwork forms a gradually increasing nozzle 41, that conforms substantially to the flame formation, aids the induction of air, and serves as a means for confining or directing the flame, and also for conserving the heat in the flame. The side opening 38 is provided for the insertion of a starting gas burner, but it can also serve as an inlet for primary air, if found desirable. The narrow spaced opening 28 left between the arches 25 and 29 allows secondary air, drawn from the space separating the upright furnace and the setting, to enter the zone where deflection of the burning gases occurs.

Instead of forming the top of the furnace by corbeled brickwork, the walls can extend vertically as shown in the embodiment of Fig. 4. With this arrangement the top is preferably an iron cover plate 42, either flat or of arch form, suitably protected by firebrick 43. With an arched top, the side walls are correspondingly arched into contact therewith, as at 44. The cover plate is perforated for the projection of a burner, and the perforation 45 can be so located that the center line of the burner is set at an angle away from the lower section as illustrated.

The burner 46 forms no part of this invention. It may be of any suitable construction; but, since the burner is at the top and the flow of gases is downward, a steam or air jet type of burner which injects the fuel under pressure into the combustion chamber is preferred in order to accentuate the forward flame propagation. However, by connecting the stack opening 19 to a sufficiently high stack, an area of low pressure at the bottom of the furnace can be created, causing inward flow of air at the top without requiring injection under pressure.

In operation, fuel is injected into the upper portion of the combustion chamber or space 27 and air is drawn in therewith. As the outlet is at the lower end of the chamber, the burning mixture is compelled to travel downward by the surrounding walls, which accordingly act as baffles. As the only cause for forward movement is the zone of low pressure at the bottom of the chamber created by the stack, aided more or less by forward velocity imparted by fuel injection, factors, such as the increased volume and the high temperature heat content due to combustion, act as retardants instead of accelerants. Gases from prior combustion therefore retard rapid propagation through the combustion zone with a consequent spreading and turbulence of the burning mixture within the chamber. The spreading of the flame heats the walls quickly to a radiant heat; and the heat so radiated maintains the combustion. The burning mixture in passing downward is met by secondary air, entering the reentrant angle through the narrow space 28 and somewhat preheated by its contact with the masonry, which secondary air insures completeness of the combustion. As the gases reach the horizontal section, they are deflected about the nose of the arch 25; but the blanket of secondary air, admitted into the zone of deflection, protects the arch from the high heat of the deflected gases. This permits the use of the horizontal section as part of the combustion chamber and accordingly reduces the necessary volume of the vertical portion.

The gases of combustion are led into the lower part of the setting and deflected by the baffle 15 placed tangentially to the cylindrical wall 8. This deflection directs the gases against the outer wall which in turn causes the gases to whirl or pass in a sweeping movement around the vessel. The corbelling 14 about the lower passage becomes highly heated as a consequence and heat is radiated therefrom to the vessel. By this means and in view of the fact that the vessel bottom is elevated, direct impingement of the gases normally to the vessel surface are avoided. Moreover the velocity of the gases about the vessel cannot exceed that due to the available draft. Therefore, if conditions of operation are such that an elongated flame is produced extending into the passage, the flame appears as a slowly moving stream about the vessel.

The gases encircle the vessel in the lower passage passing in a relatively horizontal direction substantially completely around the vessel until they are deflected by the baffle 15 through the opening 18 into the upper passage. Here the baffle 16 prevents circulation in the same direction and the gases, because of contact with the outer wall, are compelled to whirl in a counter direction about the vessel until they reach the stack opening 19 located substantially above the inlet opening 17. The gases entering the upper passage are considerably cooler than those in the lower passage, which is evidenced by the observation that there is scarcely any color to the brickwork surrounding the opening 18, though the corbelling 14 in the lower passage may be at a radiant heat. The counter-circulation of hot entering gases in the lower passage and relatively cool departing gases in the upper passage brings the gradually cooler escaping gases above the gradually hotter incoming gases. The average heating effect is therefore substantially the same about the whole periphery of the vessel.

As the draft causes a zone of decreased pressure, cold air is drawn into the pedestal base by the suction upon the outlets 10. Thereby the base, in addition to the insulating effect of the surrounding brickwork, is kept from injury by the hot gases.

The upwardly extending furnace and setting connected at their lower ends by horizontal section form a U-shaped construction. Comparatively small floor space is occupied by such a compact arrangement, the necessary combustion volume being supplied by the vertical height of the furnace and the horizontal section. This construction brings the burners and associated controls on the upper or operating level of the vessel; consequently the operator can readily adjust the furnace operation to give the conditions of heat and temperature required.

With this construction of furnace and setting, the life of a vessel is greatly increased, and in fact its internal, rather than external, disintegration becomes a controlling factor. No need arises for turning the vessel, and the prolonged contact of the heating gases due to their horizontal movement about the vessels gives an efficient transfer of heat.

I claim:

1. Heating apparatus comprising in combination a container for substances to be heated, passages about said container for conveying hot fluids about and in contact with said container, means associated with said passages for generating the hot fluids before introduction into said passages, and means at the operating level of the container for controlling the generation of the hot fluids.

2. Heating apparatus of upright U-shaped formation having a setting for a container as one leg of the U, a furnace as the other leg of the U, and a section connecting the lower portions of the setting and the furnace, said setting and furnace having communication with each other only at said lower portions.

3. Heating apparatus comprising in combination a container for substances to be heated, passages about said container for conveying heating fluids, said container forming a wall of said passages, a separated generator for the heating fluids located outside of said passages, and a section connecting said generator and one of said passages, said section directing said heating fluids into said passage without direct normal impingement upon said container.

4. Heating apparatus comprising in combination a container for substances to be heated, vertically superimposed passages about said container for conveying heating fluids, an outlet from the upper passage, an inlet to the lower passage, a furnace for generating the heating fluids, fuel supplying means in the upper portion of said furnace, and an outlet from the lower portion of said furnace connected to said inlet to the lower passage.

5. Heating apparatus comprising in combination a container for substances to be heated, a supporting wall spaced from said container, said wall having ledges contacting said container to form a plurality of horizontal passages about said container, a furnace connected to one of said passages, said furnace being located beside said container and without said wall, and an outlet connected to another of said passages.

6. Heating apparatus comprising in combination a container, a wall supporting said container and having a plurality of connected channels formed therein for directing heated fluids about and in contact with the container but without direct normal impingement upon the same, a separated furnace for generating said heated fluids, means connected to one of said channels for supplying said heated fluids tangentially to a horizontal surface of said container, and an outlet from another of said channels.

7. Heating apparatus comprising in combination, a container for substances to be heated, a wall supporting said container and having a plurality of connected horizontal passages therein about said container, a furnace associated with a lower horizontal passage, said furnace being located beside said container and without said wall, and an outlet from the upper of said horizontal passages.

8. Heating apparatus comprising in combination, a container for substances to be heated, a setting for said container, a separated furnace associated with said setting, said furnace extending upwardly to the operating level of said container, and fuel supply means for said furnace at the operating level.

9. A furnace construction comprising a vertical combustion chamber, a horizontal section extending from the lower portion and forming a reentrant angle with said chamber, an a removable portion at said reentrant angle.

10. A furnace construction comprising a vertical combustion chamber, a horizontal section extending from the lower portion and forming a reentrant angle with said chamber, and an air inlet at said reentrant angle.

11. A furnace construction comprising a vertical combustion chamber, a primary air inlet at the upper portion of said chamber, a horizontal section extending from the lower portion and forming a reentrant angle with said chamber, and a secondary air inlet at said reentrant angle.

12. A furnace construction comprising a vertical combustion chamber, an inlet for air in the upper portion of said chamber, a burner for fuel in the upper portion of said chamber, a horizontal chamber connected with the combustion chamber at the lower portion thereof and forming a reentrant angle therewith, an arch in the wall of the combustion chamber at the reentrant angle, and a second arch in said wall located above said reentrant angle, carrying the weight of said wall, and spaced from said first-mentioned arch to form between them a passage for air leading into said combustion chamber.

13. A method of heating which comprises feeding fuel mixed with air downwardly into a combustion zone, burning said mixture, baffling the burning mixture within said zone, and directing the hot products of combustion from the lower part of the zone into the lower part of an adjoining chamber and upwardly about a container to be heated substantially without direct impingement upon said container.

14. A method of heating a container which comprises feeding liquid fuel mixed with air downwardly into a combustion chamber, burning said mixture, baffling the burning mixture within said chamber, further baffling the burning mixture by deflecting and directing the hot products of combustion from the lower portion of the combustion chamber to the lower portion of an adjoining chamber and about a container therein to be heated substantially without direct impingement of the gases of combustion upon said container, and feeding secondary air into the combustion chamber at the point of deflection.

15. The combination in a heating apparatus of a setting for a container comprising a pedestal for engaging the container bottom, a hollow base for suporting the pedestal, an annular wall about said base, a wall concentric with said annular wall for engaging the upper portion of the container, said concentric wall having openings therein for the inflow and outflow of heating gases, means for introducting a cooling gas into said base, and an outlet in said base leading from its interior to the space between said walls.

16. In a heating apparatus, a setting for a container comprising a central support for engaging the container bottom, a wall engaging the upper portion of the container, said wall having an inlet opening and an outlet opening, and a baffle extending from said wall adjacent to said inlet opening and tangentially to said support.

17. A heating apparatus having in combination a setting for a container comprising a central support for engaging the container bottom, a wall for engaging the upper portion of the container, a baffle extending from said wall tangentially to said support, and a horizontal course for contacting the container intermediate the upper portion and the bottom of the container, said wall having an inlet opening below said course and an outlet opening above said course.

18. A heating apparatus having in combination a setting for a container comprising a wall for enclosing the container and forming a heating chamber, a hollow base within said chamber for supporting the container, means for passing a cooling gas into said base and a passage leading from said base to said chamber.

19. A heating apparatus having in combination a support for a container, said support comprising a base and means for passing air through said base.

20. A heating apparatus having in combination a support for a container, said support comprising a hollow base, means for conducting air to said base, and an outlet in said base for said medium.

21. A heating apparatus having in combination a support for a container, said support comprising, a centrally disposed hollow base, a wall surounding said base, means extending through said wall for conducting a cooling gas into said base, and an outlet in said base for said gas.

22. A heating apparatus of upright U-shaped formation having a setting for a container as one leg of the U, a furnace as the other leg of the U, a section connecting the lower portions of the setting and the furnace, said setting and furnace having communication with each other only at said lower portions, a burner at the upper portion of the furnace, and means at the operating level of the container for controlling the burner.

23. A heating apparatus having in combination a setting for a container comprising a central support for engaging the container bottom, a wall for engaging the upper portion of the container, a baffle extending from said wall tangentially to said support, and a horizontal course for contacting the container intermediate the upper portion and the bottom of the container, said wall having an inlet opening below said course, an outlet opening above said course, both openings being on the same side of said baffle, and said course having an opening on the opposite side of said baffle.

24. A heating apparatus having in combination a setting for a container comprising a central support for engaging the container bottom, a wall for engaging the upper portion of the container, a baffle extending from said wall tangentially to said support, a horizontal course for contacting the container intermediate the upper portion and the bottom of the container, said course having an opening on one side of the baffle, said wall having an outlet opening above said course on the opposite side of said baffle and an opening forming an inlet below said course on the same side of the baffle as said outlet opening, and a furnace for generating hot gases connected with said setting by means of said inlet.

25. A method of heating which comprises feeding fuel mixed with air downwardly into a combustion zone, burning said mixture, baffling the burning mixture within said zone, and directing the hot products of combustion from the lower part of said zone into the lower part of an adjoining chamber and upwardly about a container to be heated.

26. A method of heating a container which comprises feeding liquid fuel mixed with air downwardly into a combustion chamber, burning said mixture, baffling the burning mixture within said chamber, further baffling the burning mixture by deflecting and directing the hot products of combustion from the lower portion of the combustion chamber to the lower portion of an adjoining chamber and about a container therein to be heated, and feeding secondary air into the combustion chamber at the point of deflection.

27. Heating apparatus comprising in combination a container for substances to be heated, and means for passing heating gases in counter-current directions substantially completely around said container while in contact therewith.

28. Heating apparatus comprising in combination a container for substances to be heated, means for passing heating gases in a relatively horizontal direction substantially completely around said container while in contact therewith, and means for passing said gases in a counter-current direction around said container while in contact therewith.

29. A heating apparatus having in combination a setting for a container comprising a hollow central support for engaging the container bottom, a wall for engaging the upper portion of the container forming a chamber, a baffle extending from said wall tangentially to said support, a horizontal course for contacting the container intermediate the upper portion and the bottom of the container, said course having an opening on one side of said baffle, said wall having an outlet opening above said course and on the opposite side of said baffle and an inlet opening below said course and on the same side of the baffle as said outlet opening, means extending through said wall for conducting air to the interior of said hollow support, and a passage connecting the interior of said hollow support with said chamber, and a separated furnace for generating hot gases connected with said setting by means of said inlet opening, said furnace comprising a vertical combustion chamber, a horizontal section extending from the lower portion of said chamber and forming a reentrant angle with said chamber, a primary air inlet in the upper portion of said chamber, a secondary air inlet at said reentrant angle, a burner at the upper portion of said furnace, and means at the operating level of said container for controlling said burner.

30. A method of heating which comprises passing burning fuel downwardly through a combustion chamber, withdrawing the hot products of combustion from the combustion chamber, directing said products into a heating chamber separated from said combustion chamber, and passing said products about a container to be heated in said heating chamber.

31. A method of heating which comprises passing burning fuel downwardly through a combustion chamber, withdrawing the hot products of combustion from the combustion chamber, directing said products into a heating chamber separated from said combustion chamber, and passing said products about a container to be heated in said heating chamber tangentially to said container but without substantial direct impingement of said gases upon said container.

32. A method of heating which comprises passing burning fuel downwardly through a combustion chamber, withdrawing the hot products of combustion from the combustion chamber, and passing the hot products of combustion in counter-current directions about a container to be heated and in contact therewith.

33. A method of heating which comprises feeding fuel and air downwardly into a combustion chamber, burning said mixture in said chamber, baffling the burning mixture by deflecting and directing the hot products of combustion from the lower portion of the combustion chamber to the lower portion of an adjoining chamber, and passing the hot products of combustion in counter-current directions substantially completely around a container to be heated.

34. A method of heating which comprises feeding fuel and air downwardly into a combustion chamber, burning said mixture in said chamber, baffling the burning mixture by deflecting and directing the hot products of combustion from the lower portion of the combustion chamber to the lower portion of an adjoining chamber, passing the hot products of combustion in one horizontal direction substantially completely around a container to be heated, and passing the resulting relatively cool gases in the opposite horizontal direction around the container and in heat transferring relation with said hot products of combustion.

35. A method of heating which comprises feeding fuel and air downwardly into a combustion chamber, burning said mixture in said chamber, baffling the burning mixture by deflecting and directing the hot products of combustion from the lower portion of the combustion chamber to the lower portion of an adjoining chamber, passing the hot products of combustion in one horizontal direction substantially completely around a container to be heated and in contact therewith, and passing the resulting relatively cool gases in the opposite horizontal direction around the container and in heat transferring relation with said hot products of combustion.

In testimony whereof I affix my signature.

SIDNEY E. MEYERS.